Dec. 31, 1929.　　　K. E. LYMAN　　　1,741,853
AUTOMATIC TRANSMISSION
Filed March 19, 1928　　　4 Sheets-Sheet 1

Inventor:
Kenneth E. Lyman,
By Cromwell, Greist & Warden
Attys.

Dec. 31, 1929. K. E. LYMAN 1,741,853
AUTOMATIC TRANSMISSION
Filed March 19, 1928 4 Sheets-Sheet 2

Inventor:
Kenneth E. Lyman,
By Cromwell, Priest + Warden
Attys.

Dec. 31, 1929.　　　K. E. LYMAN　　　1,741,853
AUTOMATIC TRANSMISSION
Filed March 19, 1928　　　4 Sheets-Sheet 4

Inventor:
Kenneth E. Lyman,
By Cromwell, Greist & Warden
Attys.

Patented Dec. 31, 1929

1,741,853

UNITED STATES PATENT OFFICE

KENNETH E. LYMAN, OF HINSDALE, ILLINOIS, ASSIGNOR, BY MESNE ASSIGNMENTS, TO AUTOMATIC TRANSMISSION COMPANY, OF ROCKFORD, ILLINOIS, A CORPORATION OF ILLINOIS

AUTOMATIC TRANSMISSION

Application filed March 19, 1928. Serial No. 262,646.

The principal object of the invention is to provide an improved motor vehicle transmission which will change automatically from one speed ratio to another when a predetermined speed is reached.

Other important objects and advantages of the invention will be evident to those skilled in the art upon a full understanding of the construction, arrangement and operation of the improved transmission.

One form of the invention is presented herein for the purpose of exemplification, but it will of course be appreciated that the invention is susceptible of embodiment in other structurally modified forms coming equally within the comprehensive scope of the appended claims.

Figure 5:
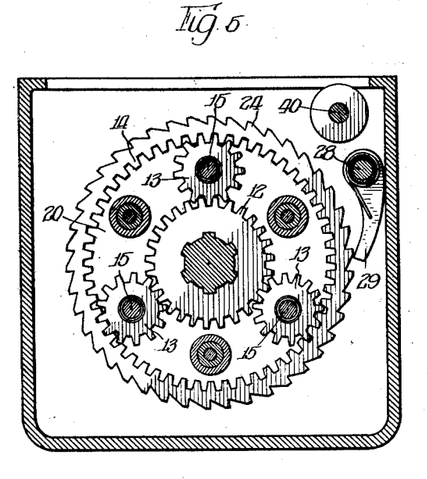
Fig. 5 is a transverse section, taken on the line 5—5 of Fig. 2, showing the planetary gearing.

The transmission, in the particular form thereof shown in the drawings, includes a driving shaft 10 and a driven shaft 11. A sun gear 12 is splined to the driving shaft 10 and meshes with three planet gears 13 (see Figs. 2 and 5) which in turn mesh with a ring gear 14. The planet gears 13 are journaled on counter-shafts 15 which are mounted in a two-part spider 16. The front part 17 of the spider has a forwardly extending hub 18 which is journaled on the driving shaft 10, and the outer periphery of the part 17 is provided with ratchet teeth 19. The rear part 20 of the spider has a rearwardly extending hub 21 which is journaled on the driving shaft 10, and a ring 22 having teeth 23 is splined on the hub 21. The ring gear 14 is provided on its outer periphery with ratchet teeth 24 which face in a direction opposite the ratchet teeth 19, and has a rearwardly extending hub 25 which is journaled on the hub 21 and is provided with teeth 26.

Figure 8:
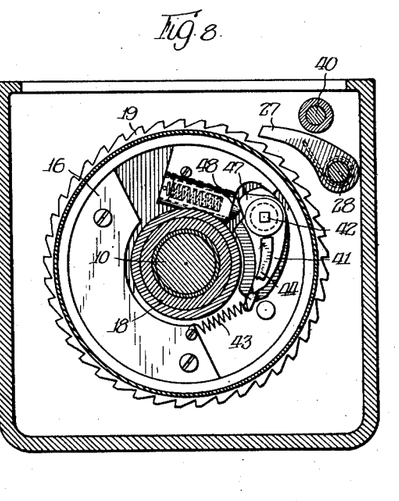
Fig. 8 is a transverse section, taken on the line 8—8 of Fig. 2, showing the centrifugally operated weight on the spider.

A spring-pressed pawl 27 (see Fig. 8) is mounted on a shaft 28 and engages with the ratchet teeth 19 to prevent rotation of the spider 16 in a clockwise direction when the transmission is in reverse. When the transmission is in the low speed ratio or in the high speed ratio, the pawl 27 is held out of engagement with the teeth 19 by means hereinafter described. Another spring-pressed pawl 29 (see Fig. 5) is mounted on the shaft 28 and engages with the ratchet teeth 24 to prevent rotation of the ring gear 14 in a counter-clockwise direction when the transmission is in the low speed ratio. When the transmission is in the high speed ratio or reverse, the pawl 29 is held out of engagement with the teeth 24 by means hereinafter described. In other words, the pawl 27 is operative only when the transmission is in reverse, and the pawl 29 is operative only when the transmission is in the low speed ratio.

A cage 30 is splined to the driven shaft 11 and contains a front set of clutch dogs 31 (see Fig. 7) for coaction with the teeth 26 on the hub 25 and a rear set of clutch dogs 32 (see Fig. 6) for coaction with the teeth 23 on the ring 22. A collar 33 encircles the cage 30, and is shiftable axially of the cage by means of a fork 34 which fits into an annular groove 35 in the collar. The collar 33 is prevented from turning on the cage by means of keys 36 which are secured to the cage and extend into grooves 37 in the collar. The dogs 31 and 32 are pivoted intermediate their ends to the cage and are provided on the outer sides of their ends with beveled surfaces 38 for coaction with complementary surfaces 39 on the inner periphery of the collar. The surfaces 39 on the collar serve to cam the two sets of dogs 31 and 32 positively into or out of engagement with the teeth 26 and 23 respectively. The fork 34 is attached to a rod 40 which is mounted above the shaft 28. The rod 40 is shiftable axially, whereby to shift the collar 33 with respect to the cage 30 and thereby set the transmission in either low, high or reverse.

When the collar 33 is shifted into its rearmost position on the cage (see Fig. 2), the dogs 32 are held in engagement with the teeth 23 (see Fig. 6) and the dogs 31 are held out of engagement with the teeth 26 (see Fig. 7), thereby connecting the spider 16 with the driven shaft 11 and producing in the transmission a low speed ratio, the ring gear 14 being held against counter-clockwise movement by the pawl 29 which, under such conditions, is in engagement with the ratchet teeth 24 on the ring gear.

When the collar 33 is shifted into its foremost position, which operation is only effected manually by means hereinafter described, the dogs 31 are held in engagement with the teeth 26 and the dogs 32 are held out of engagement with the teeth 23, thereby connecting the ring gear 14 with the driven shaft 11 and producing in the transmission a reverse drive, the spider 16 being held against clockwise movement by the pawl 27 which, under such conditions, is in engagement with the ratchet teeth 19 on the spider.

When the collar 33 is shifted into an intermediate position halfway between its rearmost and foremost positions, the dogs 31 will be held in engagement with the teeth 26 and the dogs 32 will be held in engagement with the teeth 23, thereby connecting both the ring gear 14 and the spider 16 with the driven shaft 11 and producing in the transmission a one-to-one drive, the pawls 27 and 29, under such conditions, being held out of engagement with the teeth 19 and 24 by means which will be hereinafter described.

The collar 33 is automatically shifted from its rearmost or low speed ratio position to its intermediate or high speed ratio position when a predetermined speed is reached, and the mechanism provided for causing the collar to be shifted will now be described.

Figure 9:
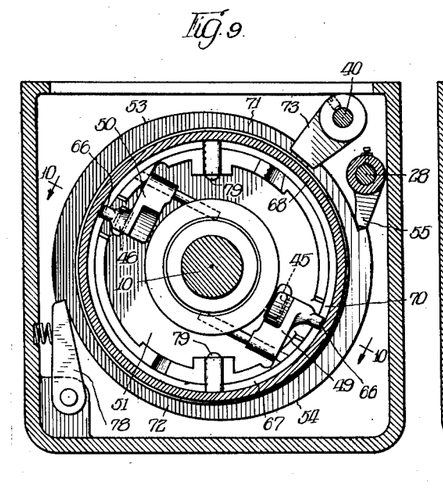
Fig. 9 is a transverse section, taken on the line 9—9 of Fig. 2, showing the low and high speed ratio stops carried by the cam plate and the clutch-releasing and ratio-changing cams formed on the cam plate.

A centrifugally operated weight 41 is pivoted at 42 to the front part 17 of the spider 16 (see Fig. 8) and a spring 43 is secured to the free end of the weight for holding the weight in when the spider 16 is either stationary or turning at a relatively low speed. A lug 44 projects from the free end of the weight 41 for cooperation, when the weight is in, with a low speed ratio stop lug 45, and for cooperation, when the weight is out, with a high speed ratio stop lug 46 (see Fig. 9). A nose 47 is formed on the pivoted end of the weight 41 for cooperation with a spring-pressed plunger 48 which is mounted on the spider adjacent the weight. The coasting surfaces of the nose 47 and plunger 48 are beveled, with the result that the plunger offers considerable resistance to outward movement of the weight when the weight is in but has no appreciable effect upon the weight when the weight has once moved out.

Figure 4:
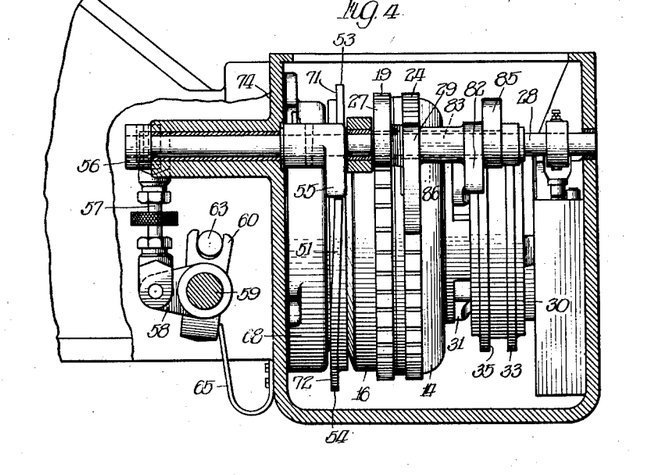
Fig. 4 is a side view, with the ratio-changing rod omitted.
Figure 10:
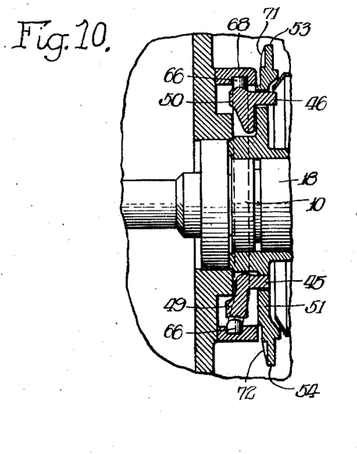
Fig. 10 is a fragmentary longitudinal section, taken on the line 10—10 of Fig. 9, showing the cam ring for causing the low and high speed ratio stops to move into or out of the path of the weight on the spider.
Figure 11:
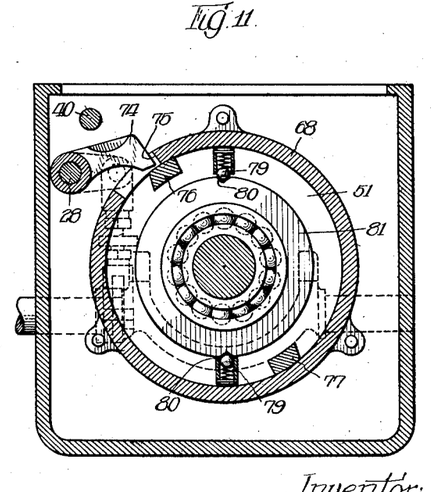
Fig. 11 is a transverse section, taken on the line 11—11 of Fig. 2, showing the stop finger for bringing the cam plate to rest after each 180° of rotation.

The low and high speed ratio stop lugs 45 and 46 (see Figs. 9 and 10) are formed respectively on two members 49 and 50 which are pivotally mounted on the front face of a cam plate 51. The plate 51 is provided with a hub 52 which is journaled on the hub 18 of the front part 17 of the spider 16. The outer periphery of the plate constitutes two spirally extending cams 53 and 54, each of which extends about the periphery of the plate through an angle of 180° and serves to oscillate a finger 55 every time that the cam plate is rotated through an angle of 180°. The finger 55 is secured to the shaft 28, and the shaft 28 has secured to its front end a horizontally extending arm 56 (see Figs. 4 and 11) which is pivoted to the upper end of a vertically extending adjustable link 57. The lower end of the link 57 is pivoted to an arm 58 which is secured to a rock shaft 59, and the rock shaft 59 carries a yoke 60 which operates a clutch 61, (see Fig. 2). The clutch 61 is interposed between the fly wheel 62 of a motor and the driving shaft 10 of the transmission.

The clutch 61 may advantageously be the automatic clutch mechanism disclosed in application Serial No. 262,647, filed March 19, 1928, but the transmission is not limited in its use to association with such clutch as any one of many standard and special clutches may be used in association with the transmission in place of the particular one shown.

Figure 2:
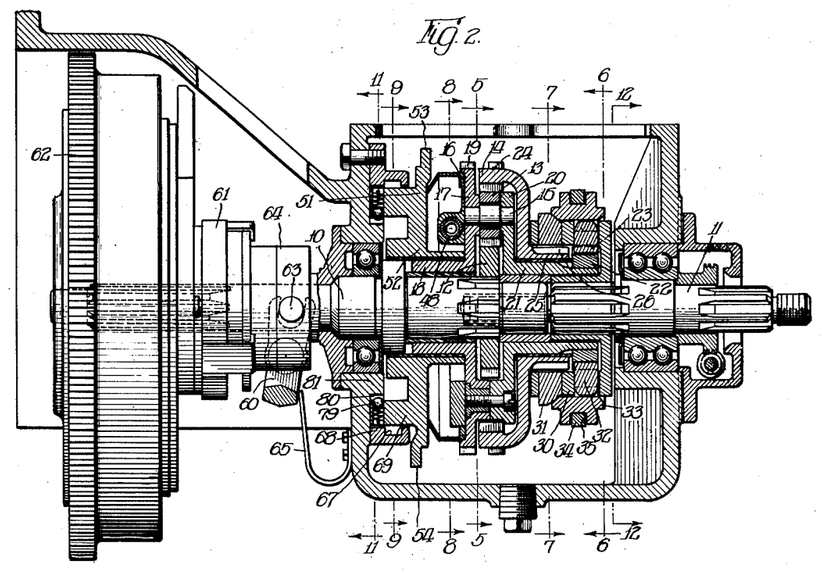
Fig. 2 is a longitudinal section, taken on the line 2—2 of Fig. 1.

The yoke 60 engages with two trunnions 63 which project from the opposite sides of an axially shiftable ring member 64 of the clutch. The ring member 64 is shown in Fig. 2 in its rearmost position, which position it occupies when the clutch is engaged. Every time that the cam plate 51 rotates through an angle of 180°—which it does every time that the collar 33 is shifted to change the speed ratio—either the cam 53 or the cam 54 swings the finger 55 out and the ring member 64 of the clutch is in consequence shifted forwardly to release the clutch, which shifting is accomplished through cooperation of the elements 55, 28, 56, 57, 58, 59, 60 and 63. A spring 65 bears against the yoke 60 and tends to hold the ring member 64 in its rearmost position.

When the weight 41 is in, the cam plate 51 is rotated through one angle of 180° by engagement of the lug 44 on the weight with the low speed ratio stop lug 45, and, when the weight 41 is out, the cam plate 51 is rotated through the remaining angle of 180° by engagement of the lug 44 on the weight with the high speed ratio stop lug 46, the lug 46 being farther from the center of the cam plate 51 than the lug 45.

The stop lugs 45 and 46, project rearwardly from the members 49 and 50 through apertures in the cam plate 51 (see Fig. 10), and the members 49 and 50 are provided with radially extending studs 66 which fit within an annular groove 67 formed in a stationary ring 68 which encircles a forwardly extending flange 69 on the cam plate 51. The groove 67 is provided at one point in its circumference with a rearwardly offset cam portion 70, and, when the cam plate 51 has been rotated 180° by engagement of the lug 44 with one of the stop lugs, that particular stop lug will be retracted from the path of the lug 44 by reason of the stud 66 associated with that stop lug entering the offset cam portion 70 of the groove 67, and the cam plate 51 will be brought to rest, while the spider 16 with which the lug 44 moves will continue to rotate.

The cam plate 51 is provided with two helically extending cam surfaces 71 and 72 which are coextensive with the cam surfaces 53 and 54 and are formed on the side faces of the periphery of the cam plate. A bifurcated member 73 embraces the periphery of the plate in engagement at all times with either the cam surface 71 or the cam surface 72, and is secured to the rod 40 which shifts the collar 33. When the transmission is in a low speed ratio and the speed of rotation has increased enough to move the weight 41 out, the lug 44 on the weight will come into engagement with the high speed ratio stop lug 46 and cause the cam plate 51 to rotate 180°, whereupon the cam surface 71 will shift the bifurcated member 73, together with the rod 40, toward the front end of the transmission and cause the collar 33 to shift forwardly from a low speed ratio position wherein it is locking the spider 16 to the driven shaft 11 to a high speed ratio position wherein it is locking both the spider 16 and the ring gear 14 to the driven shaft. Similarly, when the transmission is in a high speed ratio and the speed of rotation has decreased enough to move the weight 41 in, the lug 44 on the weight will come into engagement with the low speed ratio stop lug 45 and cause the cam plate 51 to rotate another 180°, whereupon the cam surface 72 will shift the bifurcated member 73, together with the rod 40, toward the rear of the transmission and cause the collar 33 to shift rearwardly from the high speed ratio position to the low speed ratio position.

Every time that the cam plate 51 is rotated 180°, it comes to rest, because the particular stop lug 45 or 46 which is engaged by the lug 41 to cause such rotation is withdrawn from engagement with the lug 41 by the action of the offset cam portion 70 of the groove 67. The cam plate 51 is prevented from rotating more than 180° by a stop finger 74 (see Fig. 11) which is secured to the finger 55 in angular offset relation to the same and is swung by the finger 55 through an aperture 75 in the ring member 68 into the path of either one of two lugs 76 and 77 on the flange 69 of the cam plate 51. The finger 74 halts the cam plate 51 abruptly, and the cam plate is prevented from rebounding in the opposite direction by means of a spring-pressed pawl 78 (see Fig. 9) which moves inwardly behind and interlocks with one of the shoulders formed by the ends of the cam surfaces 53 and 54. After the cam plate 51 has been brought to rest in the proper position by the stop finger 74 and the pawl 78, the cam plate is held against inadvertent movement in that position by spring-pressed balls 79. The balls 79 are carried by the cam plate 51 and protrude into indexing notches 80 formed in an annular shoulder 81 on the front end of the transmission casing.

Figure 7:
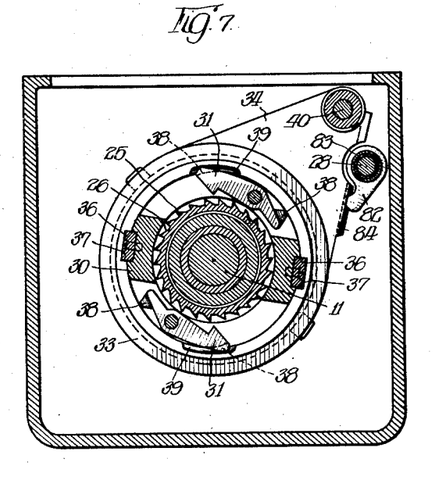
Fig. 7 is a transverse section, taken on the line 7—7 of Fig. 2, showing the releasable high speed ratio connection between the ring gear and the cage.

When the collar 33 is shifted from its rearmost low speed ratio position to its intermediate high speed ratio position, the pawl 29, which normally engages with the ratchet teeth 24 on the ring gear 14 to prevent counter-clockwise rotation of the ring gear, is withdrawn from engagement with the teeth 24 by means of a cam finger 82 on the shaft 28, which cam finger is secured to the pawl 29 through an intervening sleeve 83 (see Fig. 4), and is swung outwardly by a beveled surface 84 on the fork 34 (see Fig. 7).

Figure 6:
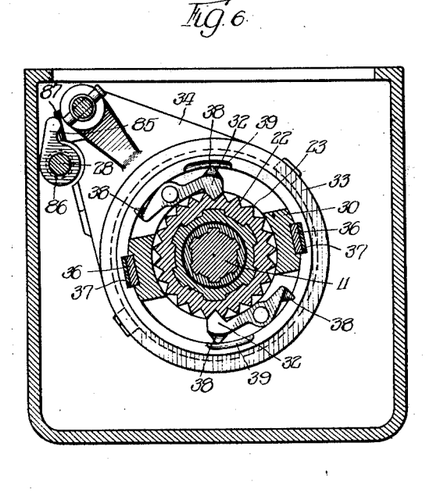
Fig. 6 is a transverse section, taken on the line 6—6 of Fig. 2, showing the releasable low speed ratio connection between the planet spider and the cage secured to the driven element.

When the collar 33 is in its rearmost low speed position, the pawl 27, which is designed to engage with the ratchet teeth 19 on the spider 16, is held out of engagement with the teeth 19 by means of a cam finger 85 on the shaft 28 which is secured to the pawl 27 through an intervening sleeve 86 (see Fig. 4) and is held outwardly by another beveled surface 87 on the fork 34 (see Fig. 6). The fork 34 does not release the cam finger 85 until the collar has been shifted into its foremost position.

Figure 12:
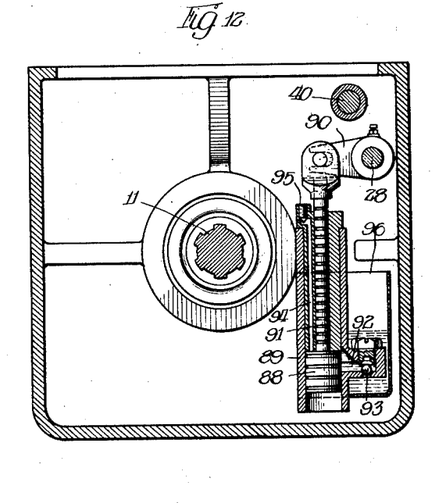
Fig. 12 is a transverse section, taken on the line 12—12 of Fig. 2, showing the dash pot for preventing the clutch from re-engaging too abruptly after it has been released.

Whenever the rod 40 is shifted to change the speed ratio, the shaft 28 is oscillated to release the clutch 61 during such change, and, in order to prevent a too abrupt re-engagement of the clutch, the return action of the shaft 28 is retarded by a piston 88 which operates in an oil-filled dash pot 89 (see Fig. 12). The piston 88 is connected with the shaft 28 by a lever 90 and a piston rod 91. The dash pot 89 is provided with an inlet 92 which is controlled by a ball check valve 93, and is also provided with an outlet 94 which is controlled by an adjustable screw 95. On each down stroke of the piston 88, oil which has accumulated in a cup-shaped well 96 enters the dash pot 89 above the piston through the inlet 92, and, on each up stroke of the piston, the trapped oil is expelled slowly from the dash pot through the outlet 94. By adjusting the screw 95, the speed of return movement may be easily regulated.

Figure 1:
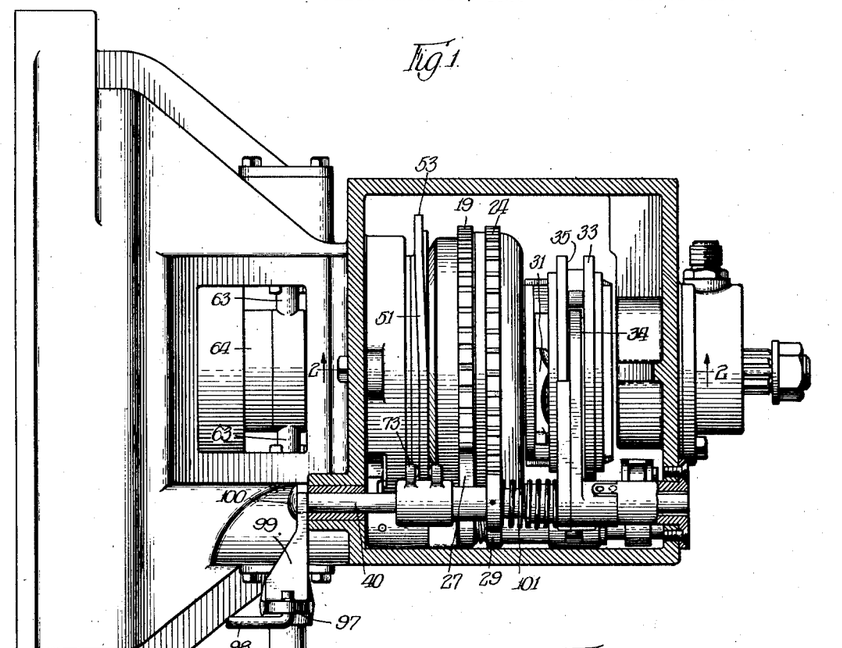
Fig. 1 is a plan view of the transmission.
Figure 3:
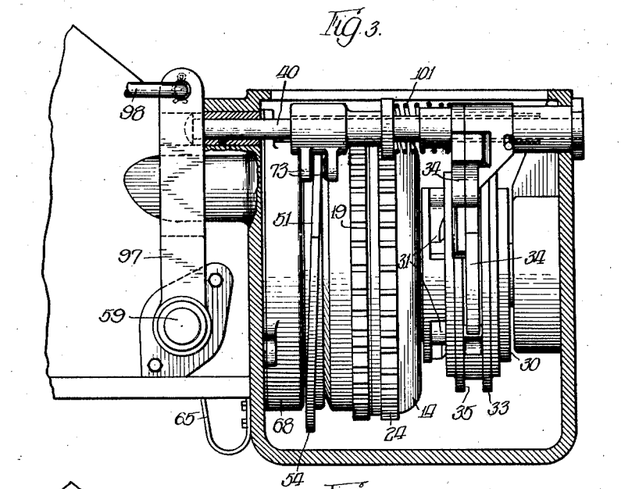
Fig. 3 is a side view, with the clutch-releasing shaft omitted.

In order to shift the transmission into reverse, it is necessary to move the collar 33 into its foremost position, wherein the dogs 31 are held in engagement with the teeth 26 whereby to connect the ring gear 14 with the driven shaft and the dogs 32 are held out of engagement with the teeth 23 whereby to disconnect the spider 16 from the driven shaft. Inasmuch as the cam surfaces 71 and 72 on the cam plate 51 are designed only to shift the collar 33 back and forth between its rearmost and intermediate positions, supplemental means must be provided to set the transmission in reverse. Such means consists of a lever 97 (see Fig. 3) which is pivotally connected to the shaft 59 and is oscillated by a link 98 which extends forwardly to a suitable hand or foot control. The lever 97 is provided intermediate its ends with a laterally extending bracket 99 (see Fig. 1) which engages behind a head 100 which is formed on the front end of the rod 40. When the lever 97 is swung forwardly, it will shift the rod 40, and the fork 34 will move forwardly a corresponding distance. If the bifurcated member 73 in engagement with the cam plate 51 were secured rigidly to the rod 40, such operation would be impossible because the cam plate 51 would prevent the bifurcated member 73 from moving. This apparent difficulty is obviated, however, by mounting the bifurcated member 73 so that it can move toward the fork 34 along the rod 40 and preventing it from moving toward the fork by the provision of a stiff spacing spring 101 between the bifurcated member and the fork, which spring is strong enough not to yield when the cam plate 51 moves the bifurcated member 73 rearwardly but is not so strong as to resist compression when the rod 40 is shifted forwardly by the lever 97. The transmission may of course be shifted manually from a low speed ratio to a high speed ratio by means of the lever 97.

The operation of the transmission will now be described:

Starting with the transmission in low—which is the position in which the various parts of the transmission are shown in the drawings—the transmission will operate in low until the speed of rotation of the spider 16 has accelerated to a point wherein the weight 41 moves out under centrifugal force and the lug 44 on the weight comes into engagement with the high speed ratio stop lug 46 on the cam plate 51. When this occurs, the cam plate 51 is forced to rotate 180°, thereby causing the clutch 61 to be released, the ring gear 14 to be connected with the driven shaft 11, which shaft is already connected with the spider 16, the pawl 29 to be withdrawn from the teeth 24 on the ring gear, and the clutch 61 to be re-engaged. The transmission will then commence to operate in high.

Should the speed of rotation of the driven shaft 11 decrease beyond a certain point—which point is determined by the mass of the weight 41 and the strength of the spring 43—the spring 43 will overcome the centrifugal force acting on the weight and the weight will move in and the lug 44 on the weight will come into engagement with the low speed ratio stop lug 45 on the cam plate 51. When this occurs, the cam plate 51 is forced to rotate 180°, thereby causing the clutch 61 to be released, the ring gear 14 to be disconnected from the driven shaft 11, the pawl 29 to be re-engaged with the teeth 24 on the ring gear, and the clutch 61 to be re-engaged.

Whenever it is desired to place the transmission in reverse, the rod 40 is shifted forwardly as far as possible by the lever 97, thereby causing the ring gear 14 to be connected with the driven shaft 11, the pawl 29 to be withdrawn from the teeth 24 on the ring gear, the spider 16 to be disconnected from the driven shaft 11, and the pawl 27 to be engaged with the teeth 19 on the spider 16. When the rod 40 is shifted to place the transmission in reverse, it is not necessary to provide means for simultaneously releasing the clutch if the clutch disclosed in application Serial No. 262,647, filed March 19, 1928, is used, as that clutch automatically assumes a released position when the transmission is stationary, as it must be in order to be placed in reverse. If a clutch of ordinary construction is employed, however, the same may be released by a suitable manual control.

I claim:

1. In a transmission, a driving element, a driven element, means for connecting said driving and driven elements in different speed ratios, and means for automatically varying the ratio comprising a normally stationary cam member, a releasable connection determined by the position of said cam member, and a centrifugally-operated weight member for rotating said cam member and changing the position thereof.

2. In a transmission, a driving element, a driven element, gears for connecting said driving and driven elements in different speed ratios, and means for automatically varying the ratio comprising a normally stationary rotatable cam member, a releasable connection determined by the angular position of said cam member, and a centrifugally-operated weight member for changing the angular position of said cam member.

3. In a transmission, a power source, a driving element, a clutch for connecting said power source and driving element, a driven element, means for connecting said driving and driven elements in different ratios, and means for automatically releasing the clutch and varying the ratio comprising a normally stationary cam member, a releasable connection determined by the angular position of said cam member, and a centrifugally-operated weight member for changing the angular position of said cam member.

4. In a transmission, a power source, a driving element, a clutch for connecting said power source and driving element, a driven element, gears for connecting said driving and driven elements in different speed ratios, and means for automatically releasing the clutch and varying the ratio comprising a normally stationary cam member, a connection between said cam member and said clutch for releasing said clutch while the position of said cam member is being changed, a connection between said cam member and said gears for changing the speed ratio while the position of said cam member is being changed, and a centrifugally-operated weight member for changing the angular position of said cam member when a predetermined speed is reached.

5. In a transmission, a power source, a driving element, a clutch for connecting said power source and driving element, a driven element, gears for connecting said driving and driven elements in different speed ratios, and means for automatically releasing the clutch and varying the ratio comprising a normally stationary cam member, a connection between said cam member and said clutch for releasing said clutch while the position of said cam member is being changed, a connection between said cam member and said gears for changing the speed ratio while the position of said cam member is being changed, a centrifugally-operated weight member, and a connection between said weight member and said cam member for changing the angular position of said cam member when a predetermined speed is reached.

6. In a transmission, a driving element, a driven element, means for connecting said driving and driven elements in different speed ratios, and means for automatically varying the ratio comprising a rotatable member, a connection between the rotatable member and the connecting means for varying the ratio when the position of said rotatable member is changed, and a centrifugally-operated weight member for driving the rotatable member to change the position thereof when a predetermined speed is reached and the weight member is thrown out into engagement with the rotatable member.

7. In a transmission, a driving element, a driven element, gears for connecting said driving and driven elements in different speed ratios, and means for automatically varying the ratio comprising a rotatable cam plate coaxial with the driving and driven elements, means for establishing a low speed ratio when the cam plate is turned through one angle, means for establishing a high speed ratio when the cam plate is turned through another angle, and a centrifugally-operated weight member which moves outwardly and engages with the cam plate to rotate the same through the last mentioned angle when a predetermined speed is reached and which moves inwardly and engages with the cam plate to rotate the same through the first mentioned angle when a speed slower than said predetermined speed is reached.

8. In a transmission, a driving element, a driven element, gears for connecting said driving and driven elements in different speed ratios, and means for automatically varying the ratio comprising a rotatable cam plate coaxial with the driving and driven elements, means for establishing a low speed ratio when the cam plate is turned through one angle, means for establishing a high speed ratio when the cam plate is turned through another angle, a centrifugally-operated weight member which moves outwardly and engages with the cam plate to rotate the same through the last mentioned angle when a predetermined speed is reached and which moves inwardly and engages with the cam plate to rotate the same through the first mentioned angle when a speed slower than said predetermined speed is reached, and means for bringing the cam plate to rest after it has rotated through either of said angles.

9. In a transmission, a driving element, a driven element, means for connecting said driving and driven elements in different speed ratios, and means for automatically varying the ratio comprising a centrifugally-operated weight member movable into different positions at different speeds, means engageable by the weight member in one position for placing the connecting means in one ratio, and means engageable by the weight member when in another position for placing the connecting means in another ratio.

10. In a transmission, a driving element, a driven element, means for connecting said driving and driven elements in different speed ratios, and means for automatically varying the ratio comprising a centrifugally-operated weight member movable into different positions at different speeds, means engageable by the weight member in one position for placing the connecting means in one ratio, means engageable by the weight member when in another position for placing the connecting means in another ratio, and means for preventing the weight member from changing its position until after a predetermined speed is reached.

11. In a transmission, a driving element, a driven element, means for connecting said driving and driven elements in different speed ratios, and means for automatically varying the ratio comprising a centrifugally-operated weight member movable into different positions at different speeds, means engageable by the weight member in one position for placing the connecting means in one ratio, means engageable by the weight member when in another position for placing the connecting means in another ratio, and means comprising a spring-pressed plunger in engagement with the weight member for preventing the weight member from changing its position until after a predetermined speed is reached.

12. In a transmission, a driving element, a driven element, gears for connecting said driving element with said driven element in different speed ratios, a plurality of sets of pawls operable to establish the different ratios, a member shiftable to place said sets in or out of operation, a rotatable cam plate for shifting said member, a centrifugal governor, and high and low speed stop lugs carried by the plate and engageable alternately by the governor in different positions of the latter for rotating the cam plate to shift the pawl-operating member and vary the speed ratio.

13. In a transmission, a driving element, a driven element, gears for connecting said driven element with said driving element in different speed ratios, and means for automatically varying the ratio comprising a rotatable cam plate, a centrifugally-operated weight carried by a rotatable part of the transmission, high and low speed stop lugs carried by and projectable from the cam plate into the high and low speed paths of said weight, means for projecting and retracting said lugs alternately upon each half revolution of the same to cause the cam plate to come to rest after each 180° of rotation, and a member shiftable by the cam plate for changing the speed ratio through the gearing upon each movement of the cam plate.

14. In an automatic transmission, a housing, having bearing equipped openings in its opposed sides for driving and driven shafts which are connected within the housing by change speed mechanism, a power source with which the driving shaft is connected through a clutch, means for changing the ratio of said change speed mechanism, means for actuating said clutch and means within the housing for automatically operating both said clutch actuating means and said ratio changing means, comprising a rotatable member, a speed responsive device for rotating said member, and a member connected with said clutch actuated means and said ratio changing means and shiftable by the rotation of said rotatable member.

15. In a transmission, driving and driven shafts, change speed gearing connecting said shafts, means for changing the ratio of said gearing and means for automatically operating said ratio changing means, comprising a centrifugal weight device, a camming device rotatable by said weight device and a member shiftable by said camming device, said camming device having a plurality of camming surfaces thereon; whereby when said device is rotated said surfaces will be progressively moved into position to shift said shiftable member.

16. In a transmission, driving and driven shafts, change speed gearing connecting said shafts, means for changing the ratio of said gearing and means for automatically operating said ratio changing means comprising a centrifugal weight device, a camming device rotatable by said weight device and a member shiftable by said camming device, said camming device having a plurality of camming surfaces thereon; whereby when said device is rotated said surfaces will be progressively moved into position to shift said shiftable member, and manually operable means for shifting said shiftable member in an opposite direction for reversing the drive in the transmission.

17. In a transmission, a driving element, a driven element, means for connecting said elements in different speed ratios, and means for automatically varying the ratio, comprising a rotatable camming device, and a member shiftable in opposite directions by the rotation of said device in progressive stages in one direction.

18. In a transmission, driving and driven elements, means for connecting said elements in different speed ratios and means for automatically varying the ratio comprising a rotatable device having a plurality of camming surfaces thereon, and a device shiftable in opposite directions by said device when said camming surfaces are progressively brought into engagement therewith.

19. In a transmission, driving and driven elements, a power source, a clutch connecting said power source with said driving element, means for actuating said clutch, gears for connecting said driving and driven elements in different speed ratio, and means for automatically varying the ratio of said gears and operating the clutch actuating means comprising a rotatable member, having progressive camming surfaces therein, and a member shiftable in opposite directions when said camming surfaces are brought into progressive engagement therewith.

20. In a transmission, driving and driven shafts, means for connecting said shafts in different speed ratios, and means for automatically varying the ratio, comprising a normally stationary camming device having a plurality of camming surfaces thereon, a device shiftable when engaged by any one of said camming surfaces and a speed responsive device for actuating said camming device at pre-determined speeds of the driving shaft.

21. In a transmission, driving and driven shafts, planetary change speed mechanism connecting said shafts, comprising a sun gear, means for connecting said sun gear with the driving shaft, planet gears meshing with said sun gear, shafts for said planet gears, a carrier for said planet shafts journaled on the driving shaft, means for reversing said mechanism, means operable only when the mechanism is reversed for holding the carrier against rotation in one direction, a ring gear meshing with said planet gears, means for changing the gear ratio in said mechanism, means operable only when the mechanism is in low speed ratio for holding the ring gear against rotation in one direction and axially shiftable means for connecting either the ring gear or the planet carrier with the driven shaft, comprising co-axially disposed sleeves on the ring gear and planet carrier, one of said sleeves projecting beyond the termination of the other, clutching teeth on said sleeves and means controlled by said axially shiftable means for engaging said teeth and clutching either the planet carrier or the ring gear in driving relation with the driven shaft.

22. In a transmission, driving and driven shafts, planetary speed changing mechanism connecting said shafts, comprising a sun gear, means for connecting the sun gear with the driving shaft, a planet carrier and ring gear, an axially shiftable clutching device fixed to rotate with the driven shaft and means responsive to the speed of the planet carrier for shifting said clutching device to connect either the planet carrier or the ring gear with the driven shaft, ratchet teeth on the periphery of the planet carrier and the ring gear and pawls for engaging said ratchet teeth and preventing either the ring gear or the planet carrier from rotating in one direction when it is not connected with the driven shaft, whereby to produce either a low speed ratio or reverse drive between the driving and driven elements.

23. In a transmission, a driving element, a power source, a clutch for connecting the driving element with said power source, a driven element, planetary speed changing mechanism for connecting the driving and driven elements in different speed ratios, comprising a sun gear, planet gears and a ring gear, shafts for said planet gears, a planet carrier for said shafts, means for changing the ratio in said mechanism including an axially shiftable shaft for connecting either the planet carrier or the ring gear with the driven element, means for releasing said clutch, including a rotatable shaft, an automatic unitary control for said clutch releasing means and said ratio changing means and means operated by said clutch releasing means for arresting the rotation of either the ring gear or the planet carrier in one direction when it is not connected with the driven shaft for producing either a low speed ratio, high speed ratio or reverse drive between the driving and driven elements.

24. The combination as set forth in claim 23 and in which the said automatic unitary control comprises a normally stationary camming disc having a plurality of camming surfaces thereon and a weight responsive to the speed of the driving shaft for changing the effective positions of said camming surfaces.

25. In a transmission, a driving element, a power source, a clutch for connecting said driving element with said power source, a driven element, speed changing mechanism for connecting said driving element with said driven element, means for changing the ratio and means for releasing said clutch, a shaft functioning as an element in said ratio changing means, a shaft functioning as an element in said clutch releasing means and an automatic unitary control for actuating said shafts.

In testimony whereof I have hereunto subscribed my name.

KENNETH E. LYMAN.